Sept. 29, 1942.   A. L. BOWERS   2,296,832
PORTABLE FLAME MACHINE
Filed July 20, 1940
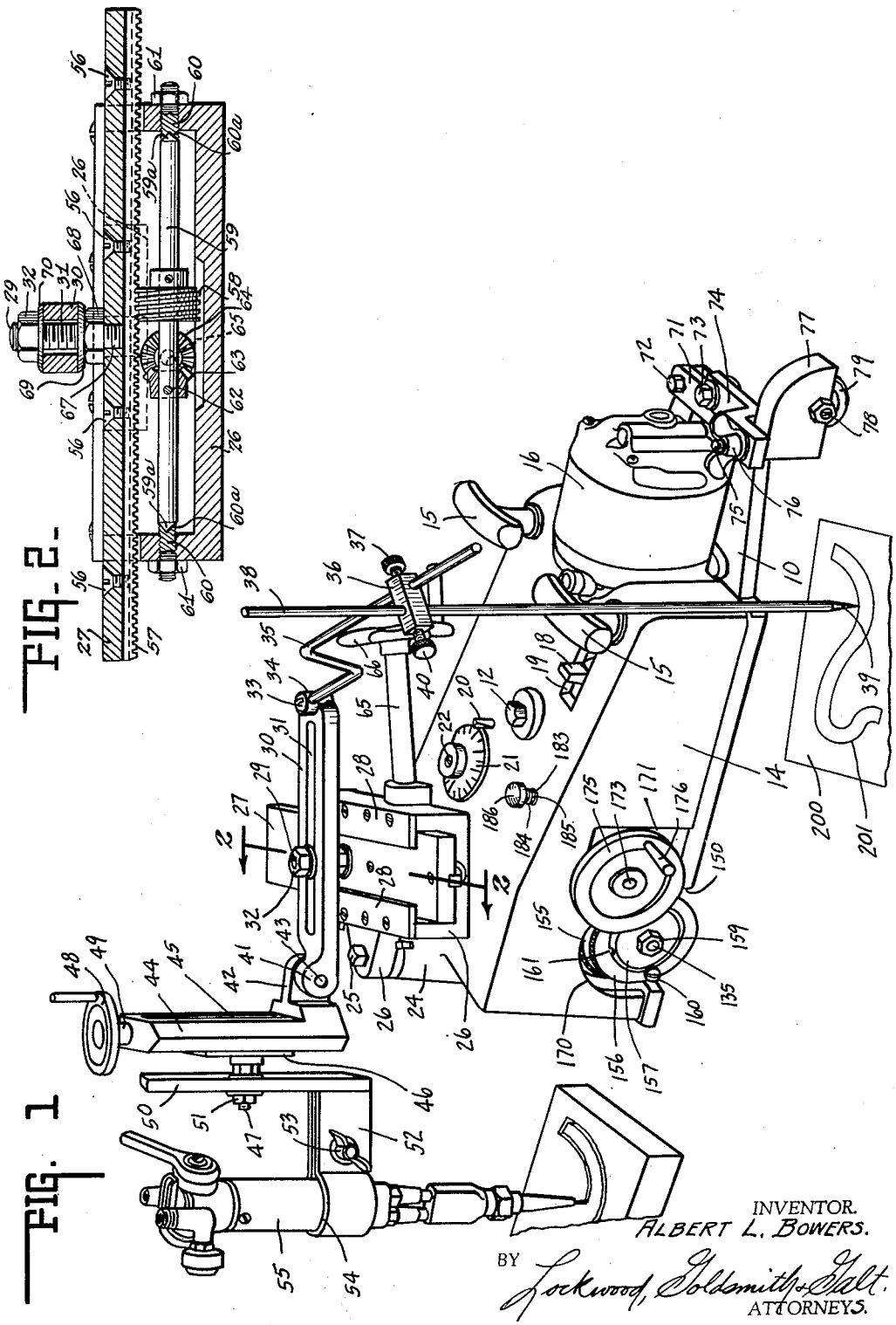
INVENTOR.
ALBERT L. BOWERS.
BY Lockwood, Goldsmith & Galt
ATTORNEYS.

Patented Sept. 29, 1942

2,296,832

UNITED STATES PATENT OFFICE 2,296,832

PORTABLE FLAME MACHINE

Albert L. Bowers, South Bend, Ind., assignor of one-half to C. A. Schrader, Mishawaka, Ind.

Application July 20, 1940, Serial No. 346,471

5 Claims. (Cl. 266—23)

This invention relates to apparatus for holding a cutting torch and when desired, a tracing element for the cutting of metals to pattern or otherwise.

The chief object of this invention is to provide a machine capable of functioning as set forth above.

The full nature of the invention will be understood from the accompanying drawing and the following description and claims:

In the drawing, Fig. 1 is a perspective view of one embodiment of the invention.

Fig. 2 is an enlarged longitudinal sectional view taken on line 2—2 of Fig. 1 and in the direction of the arrows, of the torch support base structure and its adjustably interconnected parts.

In the drawing 10 indicates a base which is provided with a bolt 12 by means of which there is clamped a cover 14. This cover provides hand grips 15 and is recessed at its rearward end to expose the motor 16 carried by the base 10. This motor is of constant speed type and operable by alternating current.

Suitably secured to the base 10 is a switch structure. The switch includes the finger portion 18 that projects through an opening 19 in casing 14. This switch is a three-position switch and when centrally positioned, as shown in Fig. 1, the motor is not energized. When positioned forwardly in the slot, the motor rotates in the forward machine driving direction. When positioned rearwardly in the slot, it rotates in a direction for moving the machine rearwardly.

The casing supports an indicator 20 and superimposed above the casing is a speed index or control member or dial 21 carried by a shaft 22 that extends through an opening in the casing.

The casing at its forward end includes an enlargement 24 and a bolt 25 is adapted to clamp an ear 26 in adjusted angular position. The ear is rigid with a combination guide and cross head structure designated by the numeral 26, which slidably supports the cross head member 27, the latter being retained therein by the plates or flanges 28.

The cross head centrally mounts the post 29 and an elongated arm 30 is provided with an elongated slot 31 in which said member 29 is seated. The arm 30 is retained in adjusted position relative to the cross head 27 by means of the nut 32.

One end of the arm is apertured to receive screw bolt 33 that extends through the eye 34 and clampingly mounts the latter on the end of the arm 30. The eye 34 is the end of an angular support member of rod character designated by the numeral 35 on which is slidably mounted a block 36 arranged for adjustable and rigid mounting by means of the locking screw bolt 37. The block 36 slidably supports a tracing point member 38 having the tracing point 39 and being adjusted rigidly with respect to the block by means of the screw bolt 40.

In Fig. 1, the numeral 200 indicates a sketch sheet with sketch 201 thereon. The attention of the operator can be devoted to having the tracing point follow the sketch since the feed or travel of the machine is positive and controlled so that irregular and peculiar shapes may be cut to accurately sketch outline and a large number so cut whenever desired or required.

The forward end of the member 30 pivotally supports at 41 an ear 42 and the pivot forming member 43 preferably is of screw bolt character for clamping said ear for adjusting in vertical angularity the guide structure 44 provided with the ways 45 in which is slidably supported the cross head 46 carrying a stud 47. A hand wheel 48 through the shaft 49 is capable of adjusting the cross head 46 in the ways 45 and maintaining the same in the adjusted position.

A member 50 is provided with an elongated aperture, not shown, and the member 47 extends therethrough and is clampingly associated therewith as at 51. This permits vertical adjustment of the torch clamping member relative to the plane of work. The member 50 at its lower end is provided with the torch clamping arrangement 52, the clamping pressure being obtained through the structure indicated at 53, applied through the socket arrangement 54, the latter being adapted to detachably receive and support the cutting torch indicated generally by the numeral 55.

It will be apparent from the aforesaid that the direction of the cutting flame can be held vertical in the event the angular relationship between members 30 and 44 is of quadrant character. Also, it will be apparent that the direction of flame may be angular to the vertical and will be that of the angularity between the members 33 and 44. The distance of the flame from the plane of the work is determinable by the relative position of the torch carrier 50—52 with respect to the support 44. The distance of the torch from the machine as well as its horizontal adjustment relative thereto, is determinable by the position of the member 30 relative to the cross head 27. The adjustment 50—47 permits the torch to be cocked or adjusted about a horizontal axis at right angles to the adjustment about the horizontal axis represented by the member 43, so that the torch may be said to be universally adjustable relative to the work.

The way structure 26 is horizontally adjustable about the axis of the clamping member 25. Likewise, the vertical pivotal arrangement 29 is capable of movement in a horizontal direction longitudinal of the guide way. The elongated slot 31 in the member 30 permits member 30 to be rotated horizontally and adjusted in any of the desired positions and also permits the torch holding structure to be moved toward and away from the machine.

The purpose of the aforesaid dual horizontal adjustment, et cetera, is to permit the cross head 27 to be manually moved in a cutting operation or for adjustment and without the manually engageable means interfering with the casing. This manual adjustment as well as the adjustable connection between the member 29 and the member 30 is shown more particularly in Fig. 2, to which reference now is had.

Secured to the underface of the cross head 27 and by the countersunk screws 56, is a rack 57, the same meshing with the worm gear 58 secured to shaft 59, the latter having tapered ends 59a receivable by tapered sockets 60a of the threaded members 60 which are carried by the cross head structure 26, the shaft being thus supported and rotatably supported by said supporting members 60, the latter being locked by nuts 61 in said cross head in adjusted position.

The shaft 59 has secured to it, as at 62, the bevel gear 63 that meshes with the bevel gear 64 carried by the shaft 65. The latter extends outwardly beyond the way structure 26, as illustrated more particularly in Fig. 1, and mounts on its free end the handwheel structure 66.

It will be observed that member 29 is a threaded post threaded into plate 27 as at 67 and is locked therein by the nut 68. Thereon bears a washer 69 which supports the elongated slotted member 30 and thereon is mounted a washer 70 upon which bears the clamping nut 32. It will be apparent that rotation of the handwheel in reverse directions will cause movement of the cross head 27 relative to the guide structure 26 in opposite directions and to the desired degree.

Reference now will be had more particularly to the right hand portions of Fig. 1. The rear end of the frame 10 supports the member 71 secured thereto as at 72, and providing a socket arrangement not shown, adapted to receive a support clamping structure 73, and an offset arm 74, the free end of which receives a spindle arrangement 75 retained by the wing nut 76 and which spindle arrangement is rigid with the horn 77 of a caster construction having its side plate portions apertured to receive the aligned axles 78 mounting wheel 79.

Furthermore, the particular power connection between the cross head and hand crank is such that smooth action or torch movement laterally or angularly is effected at a uniform speed for smooth cutting.

The hand wheel power in combination with the hand power cross feed permits the smooth and accurate cutting of small irregular shapes.

The tracer point arrangement together with controls, permits the operator to follow the pattern at all times since the machine will cut uniformly and regularly by reason of the uniformity of drive. The operator need only occasionally glance at the torch and need only manipulate the controls as required by the pattern so that major attention can be given to the latter instead of the torch.

While the invention has been illustrated and described in great detail in the drawing and foregoing description, the same is to be considered as illustrative and not restrictive in character.

The invention claimed is:

1. In a portable cutting torch machine adapted for special shape cutting having a movable carriage, the combination of a member supported by and rigid with the carriage, a second member slidably associated with the first member and adapted for shape cutting torch holder support, said members being of complementary cross-head and guideway type, rack means carried by the cross-head member, worm gear means carried by the guideway member and engageable with the rack means for smooth movement of one member relative to the other, and means for rotating said gear means including an elongated shaft member rigid with the gear means, and means carried by the elongated shaft member for rotation thereof, a pair of aligned bearing members carried by the guideway member, said shaft member and bearing members confronting ends having complementary self-centering formations, and means for adjusting the bearing members axially towards and away from each other for minimum friction and play elimination support of said shaft member and bodily axial adjustment thereof.

2. In a portable cutting torch machine adapted for special shape cutting having a movable carriage, the combination of a member supported by and rigid with the carriage, a second member slidably associated with the first member and adapted for shape cutting torch holder support, said members being of complementary cross-head and guideway type, rack means carried by the cross-head member, gear means carried by the guideway member and engageable with the rack means for smooth movement of one member relative to the other, and means for rotating said gear means including an elongated shaft member rigid with the gear means, and means carried by the elongated shaft member for rotation thereof, a pair of aligned bearing members carried by the guideway member, said shaft member and bearing members confronting ends having complementary self-centering formations, and means for adjusting the bearing members axially towards and away from each other for minimum friction and play elimination support of said shaft member and bodily axial adjustment thereof, the means carried by the elongated shaft member for rotation thereof including a bevel gear rigid with the shaft member, a second bevel gear meshing with the previous bevel gear, an elongated shaft member rigid with the second bevel gear and projecting laterally from the first mentioned elongated shaft member, and manually operable means on the end of said second mentioned shaft member for rotation thereof for cross-head member smooth movement relative to the guideway member.

3. A cutting torch machine as defined by claim 1, characterized by the elongated shaft member underlying the rack means and extending parallel thereto.

4. In a portable cutting torch machine adapted for special shape cutting having a movable carriage, the combination of a member supported by and rigid with the carriage, a second member slidably associated with the first member and adapted for shape cutting torch holder support, said members being of complementary cross-head and guideway type, rack means carried by the cross-head member, gear means carried by the guideway member and engageable with the rack means for smooth movement of one member relative to the other, and means for rotating said gear means including an elongated shaft member rigid with the gear means, and means carried by the elongated shaft member for rotation thereof, a pair of aligned bearing members carried by the guideway member, said shaft member and bearing members confronting ends having complementary self-centering formations, and means for adjusting the bearing members axially towards and away from each other for minimum friction and play elimination support of said shaft member and bodily axial adjustment thereof, the means carried by the elongated shaft member for rotation thereof including a bevel gear rigid with the shaft member, a second bevel gear meshing with the previous bevel gear, an elongated shaft member rigid with the second bevel gear and projecting laterally from the first mentioned elongated shaft member, and manually operable means on the end of said second mentioned shaft member for rotation thereof for cross-head member smooth movement relative to the guideway member, the second mentioned elongated shaft member having an axis intersecting the axis of the first mentioned elongated shaft member, the plane of said axes being parallel to the plane of cross-head movement.

5. A cutting torch machine as defined by claim 1, characterized by the addition of an articulated, adjustable tracing point structure carried by the slidable member and movable therewith when the carriage is moved and movable with and by the slidable member when the latter is moved relative to the carriage and for sketch or sample tracing purposes, the member rigid with the carriage having pivotal connection therewith for arcuate horizontal adjustment relative thereto.

ALBERT L. BOWERS.